United States Patent [19]
White

[11] 4,269,700
[45] May 26, 1981

[54] FLOTATION OF INORGANIC MATERIALS FROM GLASS USING HYDROCARBON SULFONATES

[75] Inventor: William R. White, Pomona, Calif.

[73] Assignee: Occidental Research Corporation, La Verne, Calif.

[21] Appl. No.: 127,192

[22] Filed: Mar. 4, 1980

Related U.S. Application Data

[63] Continuation of Ser. No. 888,541, Mar. 21, 1978, abandoned.

[51] Int. Cl.³ .............................................. B03B 7/00
[52] U.S. Cl. ...................................... 209/12; 209/166
[58] Field of Search ................. 209/166, 167, 12, 3; 241/20, 24

[56] References Cited

U.S. PATENT DOCUMENTS

| 2,052,227 | 8/1936 | Hood | 209/166 |
|---|---|---|---|
| 2,120,217 | 6/1938 | Harris | 209/166 |
| 2,257,808 | 10/1941 | Phelps | 209/166 |
| 2,373,688 | 4/1945 | Keck | 209/166 |
| 2,442,455 | 6/1948 | Booth | 209/166 |
| 2,769,540 | 11/1956 | Brown | 209/166 |
| 3,361,257 | 1/1968 | Hoseman | 209/166 |
| 3,425,548 | 2/1969 | Fenske | 209/166 |
| 3,482,688 | 12/1969 | Bushell | 209/166 |
| 3,844,412 | 10/1974 | Robert | 209/166 |
| 4,067,502 | 1/1978 | Morey | 241/20 |
| 4,070,273 | 1/1978 | Morey | 209/3 |

FOREIGN PATENT DOCUMENTS 2098248  10/1972  France ......................................... 209/3

OTHER PUBLICATIONS

Chem. Abst., 129530e, 129527a, 74, 1971.
"Proceeding of the Third Mineral Waste Utilization Symposium", Morey and Cummings, Glass Recovery from Mun Trash by Froth Flotation, 1971.

Primary Examiner—Robert Halper
Attorney, Agent, or Firm—Christie, Parker & Hale

[57] ABSTRACT

Particulate glass values contained in the final inorganic fraction from comminuted municipal solid wastes and having the particle size between 10 mesh and 325 mesh are recovered by froth flotation depressing the glass and causing flotation of the gangue using as the beneficiation reagent a water compatible sulfonated hydrocarbon. Glass depression occurs by use of a mineral acid or fluoride ion and maintaining pH of the media less than about 4.

29 Claims, No Drawings

FLOTATION OF INORGANIC MATERIALS FROM GLASS USING HYDROCARBON SULFONATES

CROSS REFERENCE TO RELATED APPLICATIONS

This is a continuation of application Ser. No. 888,541, filed Mar. 21, 1978, now abandoned.

BACKGROUND OF THE INVENTION

Immense and ever increasing amounts of solid trash, particularly of a municipal nature, are being generated each day. Disposal problems are growing with equal complexity. Conventional methods of refuse disposal, such as landfill or mere incineration, are becoming prohibitively expensive or creating serious pollution problems.

In particular, landfill areas are becoming fewer in number and further from the sites where the majority of the trash is generated. Incineration, because of national concern over the problems of air pollution, is being looked at with ever increasing skepticism.

Municipalities are, therefore, turning to techniques for processing solid wastes to recover, for resale or reuse, the values contained therein. This reduces the problems of pollution and helps offset the cost of processing the trash.

A general method of processing trash involves segregating the organic matter from the inorganics which includes metals, concrete, bricks, glass and the like.

With respect to the inorganic matter, ferrous materials may be separated magnetically prior to or following separation of the organics. The remaining inorganics are comminuted by crushing or grinding into particles of fine size. Some may be separated by screening and others by heavy media separations.

The tails from the treatment of municipal wastes are a mixture of finely divided sundry inorganic materials, the most valuable constituent of which is glass. The balance of inorganic materials include fine metal particles, bone, ceramics, egg shells, brick, rock, cementitious materials and the like. Unless recoverable, the glass in this tailing would have limited value as road fill as filler for asphalt or like applications.

It is known that amines serve as beneficiation reagents for the froth flotation of glass from the inorganic tails. In some instances, however, residue of solid waste is predominantly glass and it would be more economical to float the gangue of the mixture and leave the glass as the tailings. This is the subject matter of the instant invention.

SUMMARY OF THE INVENTION

It has now been found that in a process for the treatment to recover values therefrom, that the glass containing inorganic residue can be effectively treated by a flotation operation to selectively float a gangue of inorganics lean in respect to glass and leave a tailing which predominantly contains glass. The mixture in this instance is a sundry mixture of inorganics left after recovery of essentially all metals both ferrous and nonferrous as well as organics by different separation operations. It is the last residue of solid waste residue from processes as defined, for instance, in U.S. Application Ser. No. 719,261 filed Aug. 31, 1976 and incorporated herein by reference. Aside from glass the bulk of materials present include bricks, cement, coarse materials such as ground rocks, bones, egg shells, bits of metal, ceramics, porcelain and some organics. In sum, it is that mass of particles which has eluded recovery and which but for the glass would be discarded as landfill or low value use. The glass, however, is a resource worth recovery. The balance of inorganic matter is for the purposes of this invention gangue.

By the instant invention the normal process of flotation is reversed. In particular it has been found that in the formation of an aqueous slurry of the inorganic solids acidified to a pH between about 2 and about 4 by the presence of a mineral acid alone or with fluoride ion and employing as the collector reagent for the gangue a sulfonated hydrocarbon, the gangue will be floated to the substantial exclusion of particulate glass. To achieve this reverse flotation requires conditioning of the inorganic mass in the acidic medium for at least about 5 minutes and typically from about 5 to about 10 minutes. After such contact the glass will remain as the tailing while the gangue appears as the predominant part of the float.

The process of the invention, in general, involves forming a mass of particulate inorganic matter containing crushed particulate glass particles obtained, for instance, as a consequence of the several crushing and grinding operations attendant to the processing of solid wastes for recovery of the values contained therein. The mass is processed to achieve a size where the particles of gangue will float. This has been found to be 10 mesh or less. Preferably fines are removed to the end of forming a mass of a particle size in the range of from about 325 to about 20 mesh, preferably from about 200 to about 20 mesh.

Generally this may be accomplished by screening or classifying to separate out most of the metals and other inorganic residues having a particle size greater than 10 mesh, preferably greater than 20 mesh. That portion of the inorganic matter which passes through the initial screening or classifying operation is preferably deslimed and classified to remove the particles having a size smaller than about 325 mesh, preferably smaller than about 200 mesh. Simply stated there is formed a mass of floatable particles below a predetermined mesh size or between a predetermined mesh size.

To achieve a separation of the particulate glass from the mass, the resultant particulate mixture is activated with an aqueous solution at a pH from about 2 to about 4 by the presence of at least one mineral acid or fluoride ion for a period of time sufficient to make the glass substantially nonresponsive to the hydrocarbon sulfonate beneficiation reagent. The acids which may be employed include sulfuric acid, nitric acid, hydrochloric acid. Fluoridation may be provided as hydrofluoric acid, ammonium bifluoride and the like. Contact time is generally at least about 5 minutes, preferably from about 5 to about 10 minutes. Contact with the acid medium may be carried adhead of it or with concurrent addition of the beneficiation reagent.

The sulfonated hydrocarbons used to float the gangue are water compatible, i.e., water soluble, miscible or dispersible and include alkyl sulfonates, aryl sulfonates, alicyclic sulfonates, alkenyl sulfonates, alkylaryl sulfonates of at least 5, and preferably from about 10 to about 30 carbon atoms.

Although the amount of hydrocarbon sulfonate used may vary widely as to each, typical concentrations are from about 0.5 to about 4 pounds per ton of solids.

While the sulfonated hydrocarbon may be used alone, for reasons of economy, the reagent may be extended using conventional hydrocarbon extenders such as kerosene, mineral oil, fuel oil and the like. In addition, there may be included frothers which aid in the formation of a foam such as pine oil, methyl isobutyl carbinol, methyl glycol ether and the like, as are generally known to the art.

One unique feature of the flotation of gangue from particulate glass is the reduced need to cleanse the mass of organics which would appear in a normal glass float. Since the tailings are predominantly glass, the organics appear in the float as part of the gangue for discard to landfill.

DETAILED DESCRIPTION

According to the present invention there is provided a process for the separation of particulate glass from a mass of generally inorganic matter which may be formed as a consequence of the treatment of solid wastes for recovery of values contained therein.

The practice of the process of this invention involves the selective flotation of comminuted inorganic matter from a comminuted glass and involves reducing a mixture of the two to a particle size responsive to a sulfonated hydrocarbon collector reagent. Mesh size should be about 10 mesh or less preferably between about 325 and about 20 mesh, and more preferably from about 200 to about 20 mesh. Size formation is achieved by a combination of screening, comminuting and, as desired, desliming operations. To separate the particulate glass from the mass of particulate inorganic matter of similar particle sized by a flotation process there is employed as the flotation reagent at least one water compatible, i.e., water soluble, miscible or dispersible sulfonated hydrocarbon. Flotation occurs following contact of the particles with a mineral acid and/or fluoride ion for a time sufficient to deactivate the glass to that action of the beneficiating reagent. Contact is at a pH of from about 2 to 4, generally for about 5 minutes, preferably from about 5 to about 10 minutes. Generally, the contact occurs as a slurry of 70% or more solids density diluted then with water to a solids density of about 20 to about 50% by weight solids typical of flotation operations.

Typical of the glasses to be principally recovered in accordance with this invention are common bottle or container glass, window or plate glass and incandescent lamp envelopes. They are generally known as soda-lime glasses. The analysis of such glasses is from about 70 to about 73 percent by weight $SiO_2$, from 11 to about 18 percent by weight $Na_2O$, from about 7 to about 17 percent by weight CaO, the remainder essentially being other metal oxides as colorants and the like. Included in the calcium oxide analysis is magnesium oxide MgO, a substitute for calcium oxide to reduce cost and may be present in an amount of from about 3 to about 5 percent by weight based on the total weight of the glass. The most common species is formed from a mixture of about 72 percent by weight silica, about 15 percent by weight soda, about 10 percent by weight lime and magnesia, about 2 percent by weight alumina and about 1 percent by weight miscellaneous oxides.

By the term "particulate mixture of inorganic materials" as used herein, and to which the invention as a whole relates, there is meant a particulate mass containing glass particles and inorganic materials found as a residue of processing solid wastes for recovery of values therein.

The particulate mixture of inorganic materials includes glass as a value and the gangue which is responsive to the action of the sulfonated hydrocarbon under the conditions at which flotation is carried out. The "gangue" includes particles such as crushed rocks, cement, coarse materials, bricks, ceramics, porcelain, egg shells, bone, bits of metal, some glass and to the extent left therein organics including plastics. Other inorganics which float simply by aeration like mica and talc may also be present.

Under the conditions of the flotation process the gangue is substantially responsive to the beneficiating action of the sulfonated hydrocarbons such that the gangue will concentrate in the float portion with the particulate glass concentrating in the tailings. It is appreciated, however, that some glass will appear in the concentrated gangue while some gangue, especially metal particles, will appear in the glass. The operation tends to cleanse the glass of organics, however, making the organics separation operation less important.

By the term "sulfonated hydrocarbons" there is meant sulfonated saturated and unsaturated hydrocarbons, such as sulfonated alkyls, alicyclics, aryls, alkenyls, alkylaryls, alicyclicaryls, alkenylaryls and the like in which the sulfonate is in the acid or salt state. Sulfonated hydrocarbons are generally obtained by a partial or total sulfonation of olefinically unsaturated compounds as well as sulfonation of aryl groups.

Some techniques of their preparation are more particularly set forth in British Pat. No. 983,056 and French Pat. No. 1,419,652, incorporated herein by reference. Useful, but nowise a limiting of the olefins which may be sulfonated for use in the practice of this invention, are the pentenes, hexenes, heptenes, octenes, nonenes, decenes, undecenes, dodecenes, tridecenes, tetradecenes, pentadecenes, hexadecenes, octadecenes, nondecenes, eicosenes, heneicosenes, doeicosenes, trieicosenes, tetraeicosenes, pentaeicosenes, hexaeicosenes, octaeicosenes and like arylalkenes as well as mixtures thereof.

Based on the same group of alkenes described above, the alkyl and arylalkyl sulfonates are obtained by reacting the corresponding olefin with an alkaline bisulfite under free radical conditions, as more particularly set forth, for instance, in U.S. Pat. Nos. 2,653,970; 3,084,186 and 3,168,555, which are incorporated herein by reference. They may also be prepared by the addition of hydrogen sulfide to an $\alpha$-olefin to give a mercaptan followed by oxidation to the sulfonate; the addition of an olefin to thioacetic acid to give a thioester, which is then oxidized to the sulfonate; and the addition of hydrogen bromide to the olefin to give an alkyl bromide, which is converted to a sulfate by the addition of sodium sulfite.

The functional sulfonated hydrocarbons contain at least 5, preferably on the average from about 10 to about 30 carbon atoms in the compound and are water compatible, i.e. water soluble, water miscible, or water dispersible. The most common sulfonated hydrocarbons are the alkyl benzene sulfonates and sulfonated petroleum fractions, the latter typically containing on the average from about 18 to about 24 carbon atoms.

The amount of sulfonated hydrocarbon required to achieve effective separation of particulate gangue from glass is not narrowly critical and will depend in part upon the glass content of the grouping as well as whether an extender and/or a frothing agent is used.

For the run of the mill, finely divided inorganic residue such as in glass-rich solid wastes, there may be employed from about 1.15 lb. to about 4 lbs. per ton of particulate mass of substantially inorganic materials, preferably from about 0.5 lb. to about 4 lbs. per ton.

As indicated, there may be used an extender which serves, in general, to reduce the cost of the collector reagent used in the beneficiation flotation operation, particularly where the sulfonated hydrocarbon is fairly high in cost. Extenders used are generally conventional to the art and include among others, kerosene, fuel oil, mineral oil, bunker C oil, Stoddard's solvent and the like. When employed, the extender is normally present in the amount of about from 0 to about 4 lbs. per ton of inorganic residue.

Although not necessary to the practice of the process of this invention, there may be included conventional frothing aids such as pine oil, methyl-isobutyl carbinol, 2-ethylisohexanol, methyl amylalcohol, polypropylene glycol and methylglycolether and the like. In general, the amount of frothing agent which may be included in the flotation system may range from 0 to about 0.5 lbs. per ton of the inorganic residue processed.

Essential, however, to the practice of this invention is conditioning the glass particles to substantially diminish their responsiveness to the sulfonated hydrocarbon. This is accomplished in an acidic media of a pH from about 2 to about 4 as provided by the addition of a mineral acid such as sulfuric acid, hydrochloric acid, nitric acid and the like alone and/or with a fluoride ion as provided by hydrofluoric acid, ammonium fluoride and the like. The conditions for conditioning of the glass are set forth above.

While the process of this invention may be applied for the flotation separation of particulate glass from any finely divided aggregate of inorganic matter, it will be particularly described in terms of treatment of the tailings of a process for recovery of values from solid wastes.

Such an operation may begin by separating large paper stock by elutriation prior or subsequent to separation of the ferrous materials by conventional magnetic separation means. Independent of whether these preparatory operations are carried out, the balance of the trash is normally comminuted using conventional crushing and grinding operations and classified into an organic fraction and inorganic fraction. The organic fraction is pyrolyzed to form char and a gaseous stream.

As indicated, magnetic separation is generally employed at some point to separate from the waste ferrous materials which are, in turn, processed by various means to maximize the scrap value of the ferrous materials.

What generally follows is a series of comminuting, crushing and screening operations including the possibility of treatment with chemical reagents to recover, to the extent possible, the remaining metallic constituents such as copper, aluminum, brass and the like.

Soft metals, for instance, may be flattened as a consequence of crushing of the more friable materials and recovered by screening operations.

As more and more of the contained values are recovered by crushing, screening and heavy media separations, a finer residue of inorganic materials generally remains.

One of the more difficult constituents of this inorganic residue to separate as a clean fraction is glass. Glass is normally crushed to a fine state along with the inorganics which form the gangue in the several operations carried out during the processing of waste solids for the initial recovery of valuable metals.

An initial separation of a fraction containing particulate glass from the balance may be made by a screening operation. To achieve flotation in accordance with the practice of this invention, it is preferred to employ screening operations which will eventually pass particles containing the glass and be finer than about 10 mesh, preferably 20 mesh. If there has been incomplete crushing of the glass particles prior to this stage, additional finer comminution operations may be employed to further reduce particle size.

An initial screening operation may, for instance, be employed to separate a good portion of the sand, dirt and miscellaneous solids having a particle size greater than the selected mesh. The inorganic residue remaining and containing the glass particles may also be subject, if desired, to heavy media separation wherein materials having a density equal to, or less than, the materials of a density greater than the media are floated off by merely filling a vessel containing the nondescript inorganic residue with the heavy media to an overflowing state such that tne heavy media will carry away from the denser inorganic materials, glass materials and other materials of equivalent or lower density. This, as indicated, has proven to be an unsatisfactory separation where it is desired to free the glass fraction of comminuted brick and other cementitious materials. It is, however, a beneficial route to increase the glass concentration for purposes of the flotation operation.

Following the first stage of forming an inorganic fraction having a particle size less than about 10 mesh, the fraction may be deslimed and classified to form a mixture comprising particles of greater than 325 mesh, preferably greater than about 200 mesh. These fines are removed from the system as a slime and discarded as landfill.

In particular, the inorganic fraction containing the crushed glass may be prepared by initially feeding the inorganic residue containing the glass to a crushing device which uses a compressive action rather than shear functions to achieve compaction of the softer metals for screening. Examples of such comminution devices include gyratory crushers and the like. The use of a rod mill for both the flattening and grinding operations is especially effective.

Friable or brittle materials, including any large glass particles, are broken into small fragments which pass through the screening or classifying operations while the more ductile materials are flattened for separation by screening. Where heavy metals are present, fine crushing is preferred to coarser crushing or extensive grinding.

After the desliming operation which may involve washing with an aqueous solution containing the inorganic residue which has a particle size between about 20 and 325 mesh, it is then passed to a conventional flotation cell where there is added the acid and/or fluoride in a beneficiating amount of at least one sulfonated hydrocarbon with or without an extender and/or a frothing agent to cause froth flotation of the gangue. The glass fraction obtained may be characterized by the substantial absence of finely crushed brick rock and cementitious materials but may contain metals, including magnetic materials. This fraction may be passed through additional flotation separation procedures to achieve an even finer purification of the glass fraction, the inorganic gangue which remains after each froth flotation is either processed for recovery of values contained therein or discarded.

A particular advantage of the process of this invention is that the glass formed as a consequence of the flotation operation can be useful for direct feed to glass fabricating operations for the formation of glasses, containers and like objects.

While the process of this invention has been described primarily in terms of obtaining a pure glass fraction by flotation during the processing of solid wastes, it will be appreciated by one skilled in the art that the process may be employed for obtaining a pure glass fraction from many mixtures of glass and generally inorganic matter by reducing particle size of the mixture to a size compatible with the flotation operation and then floating the gangue from the portion.

Other procedures for preparing the inorganic mass for flotation are described in U.S. Application Ser. No. 603,868 filed Aug. 11, 1975 and U.S. Application Ser. No. 719,261 filed Aug. 31, 1976 each incorporated herein by reference.

EXAMPLE 1

Six hundred seventy-five parts by weight of a municipal solid waste remaining after recovery of metals and organics was formed into a mass containing particles between 325 and 20 mesh. The particles were conditioned as a 50 percent solid slurry with an equivalent of 1 pound per ton of Petronate L, a petroleum sulfonate reagent of Sonnenborn, 0.02 pound per ton of Dowfroth 250 and sulfuric acid to a pH of 2 in a Wemco flotation cell. Agitator speed was 1000 rpms and contact time was five minutes before a float was allowed to form.

An overflow containing 460 parts by weight solids was obtained and was substantially glass free. A glass rich underflow of 200 parts by weight was obtained. The glass was of good purity.

EXAMPLE 2

Fifty parts by weight of a municipal solid waste remaining after recovery of metals and organics was formed into a mass containing particles between 325 and 20 mesh. The particles were conditioned as a 50 percent solid slurry with an equivalent of 1 pound per ton of Aeropromoter 850, a petroleum sulfonate reagent of Cyanamid, in a Wemco flotation cell. The pH of the slurry was adjusted to about two by the addition of hydrofluoric acid. The mixture was diluted to a 25 percent slurry density. Agitator speed was 1000 rpms and contact time was five minutes before a float was allowed to form.

An overflow containing 34 parts by weight solids was obtained and was substantially glass free. A glass rich underflow of 15 parts by weight was obtained. The glass was of good purity.

EXAMPLE 3

Fifty parts by weight of a municipal solid waste remaining after recovery of metals and organics was formed into a mass containing particles between 325 and 20 mesh. The particles were conditioned as a 50 percent solid slurry with an equivalent of 1 pound per ton of Petronate L, a petroleum sulfonate reagent of Sonnenborn, in a Wemco flotation cell. The pH of the slurry was adjusted to about two by the addition of hydrofluoric acid. The mixture was diluted to a 25 percent slurry density. Agitator speed was 1000 rpms and contact time was five minutes before a float was allowed to form. An overflow containing 34 parts by weight solids was obtained and was substantially glass free. A glass rich underflow of 14 parts by weight was obtained. The glass was of good purity.

EXAMPLE 4

The experiment of Example 2 was repeated in all essential details except that the petroleum sulfonate reagent used was Aeropromoter 801, a product of Cyanamid, in an equivalent of two pounds per ton.

Upon flotation an overflow containing 34 parts by weight solids was obtained and was substantially glass free. A glass rich underflow of 15.5 parts by weight was obtained. The glass was of good purity.

EXAMPLE 5

Fifty parts by weight of a municipal solid waste remaining after the recovery of metals and organics was formed into a mass containing particles between 325 and 20 mesh. The particles were conditioned as a 50 percent solid slurry with an equivalent of two pounds per ton of Petroflote 362, a petroleum sulfonate reagent of Sonnenborn, in a Wemco flotation cell. The pH of the slurry was adjusted to three with addition of sulfuric and hydrochloric acids. The mixture was diluted to a 25 percent slurry density. Agitator speed was 1000 rpms and contact time was two minutes before a float was allowed to form. The flotation was conducted for a period of ten minutes.

An overflow containing 36 parts by weight solids was obtained and was substantially glass free. A glass rich underflow of 13 parts by weight was obtained. The glass was of good purity.

EXAMPLE 6

One hundred parts by weight of a municipal solid waste remaining after recovery of metals and organics was formed into a mass containing particles between 325 and 20 mesh. The particles were conditioned as a 50 percent solid slurry with an equivalent of one pound per ton of a 50/50 mixture of Petronate L (Sonnenborn) and Aeropromoter 840 (Cyanamid), both petroleum sulfonate reagents. The pH of the slurry was adjusted from about 2.5 to 3 with hydrofluoric acid and hydrochloric acid. Agitator speed was 1000 rpms and contact time was five minutes before a float was allowed to form.

An overflow containing 66 parts by weight solids was obtained and was substantially glass free. A glass rich underflow of 33.2 parts by weight was obtained. The glass was of good purity.

What is claimed is:

1. A process for recovery of glass from a particulate mixture of substantially inorganic materials including glass, the inorganic materials other than glass constituting a gangue, the glass comprising glasses having the composition of from about 70 percent to about 73 percent by weight $SiO_2$, from about 11 percent to about 18 percent by weight $Na_2O$, from about 7 percent to about 17 percent by weight $CaO$, the balance of the composition being essentially other metal oxides, which process comprises subjecting the particulate mixture at a particle size less than about 10 mesh:

(i) to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms; and (ii) to the action of a beneficiating amount of said water compatible sulfonated hydrocarbon, the gangue being responsive to the beneficiating action of said water compatible sulfonated hydrocarbon; and forming a float predominantly containing the gangue and a tailing predominantly containing the glass.

2. A process as claimed in claim 1 in which the mineral acid is selected from sulfuric acid, nitric acid and hydrochloric acid.

3. A process as claimed in claim 1 in which the fluoride ion is provided by a compound selected from the group consisting of hydrofluoric acid and ammonium bifluoride.

4. A process as claimed in claim 1 in which the water compatible sulfonated hydrocarbon contains from about 10 carbon atoms to about 30 carbon atoms.

5. A process as claimed in claim 1 in which the glass is rendered nonresponsive in the aqueous acidic medium prior to contact with the water compatible sulfonated hydrocarbon.

6. A process as claimed in claim 1 in which the water compatible sulfonated hydrocarbon is used in a concentration of from about 0.15 to about 4 lbs per ton of the particulate mixture of substantially inorganic materials including glass and in which the particulate mixture of substantially inorganic materials including glass, is a residue obtained from classifying solid waste into a generally organic fraction and a metals fraction, the portion of the residue other than glass being the gangue.

7. A process as claimed in claim 1 in which the water compatible sulfonated hydrocarbon is used in a concentration of from about 0.5 to about 4 lbs per ton of the particulate mixture of substantially inorganic materials including glass.

8. A process as claimed in claim 1 in which an extender for the water compatible sulfonated hydrocarbon is present.

9. A process for recovery of glass from a particulate mixture of substantially inorganic materials including glass, the inorganic materials other than glass constituting a gangue, the glass comprising glasses having the composition of from about 70 percent to about 73 percent by weight $SiO_2$, from about 11 percent to about 18 percent by weight $Na_2O$, from about 7 percent to about 17 percent by weight CaO, the balance of the composition being essentially other metal oxides, which process comprises subjecting the particulate mixture at a particle size between about 325 mesh and about 20 mesh:

(i) to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms; and (ii) to the action of a beneficiating amount of said water compatible sulfonated hydrocarbon, the gangue being responsive to the beneficiating action of said water compatible sulfonated hydrocarbon; and forming a float predominantly containing the gangue and a tailing predominantly containing the glass.

10. A process as claimed in claim 9 in which the mineral acid is selected from sulfuric acid, nitric acid and hydrochloric acid.

11. A process as claimed in claim 9 in which the fluoride ion is provided by a compound selected from the group consisting of hydrofluoric acid and ammonium bifluoride.

12. A process as claimed in claim 9 in which the water compatible sulfonated hydrocarbon contains from about 10 to about 30 carbon atoms.

13. A process as claimed in claim 9 in which the glass is rendered nonresponsive in the aqueous acidic medium prior to contact with the water compatible sulfonated hydrocarbon.

14. A process as claimed in claim 9 in which the water compatible sulfonated hydrocarbon is used in a concentration of from about 0.15 to about 4 lbs per ton of the particulate mixture of substantially inorganic materials including glass and in which the particulate mixture of substantially inorganic materials including glass, is a residue obtained from classifying solid waste into a generally organic fraction and metals fraction, the portion of the residue other than glass being the gangue.

15. A process as claimed in claim 9 in which the water compatible sulfonated hydrocarbon is used in a concentration of from about 0.5 to about 4 lbs per ton of the particulate mixture of substantially inorganic materials including glass.

16. A process as claimed in claim 9 in which an extender for the water compatible sulfonated hydrocarbon is present.

17. A process as claimed in claim 9 in which the particle size of substantially inorganic materials including glass is between about 200 mesh and about 20 mesh.

18. In a process for the treatment of solid wastes for recovery of values contained therein which includes classifying the solid waste into a generally organic fraction, a metals fraction and an inorganic tailing including glasses having the composition of from about 70 percent to about 73 percent by weight $SiO_2$, from about 11 percent to about 18 percent by weight $Na_2O$ and from about 7 percent to about 17 percent by weight CaO, the balance of the composition being essentially other metal oxides, said inorganic tailing being substantially free of metals, the portion of the tailing other than glass being gangue, the improvement which comprises:

(a) forming from the inorganic tailing a particulate inorganic mass including said glasses having a particle size between about 325 mesh and about 20 mesh;

(b) subjecting the particulate inorganic mass:
 (i) to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms; and
 (ii) to the action of a beneficiating amount of said water compatible sulfonated hydrocarbon, the gangue being responsive to the beneficiating action of said water compatible sulfonated hydrocarbon;

and forming a float predominantly containing the gangue and a tailing predominantly containing the glass.

19. A process as claimed in claim 18 in which the mineral acid is selected from sulfuric acid, nitric acid and hydrochloric acid.

20. A process as claimed in claim 18 in which the fluoride ion is provided by a compound selected from the group consisting of hydrofluoric acid and ammonium bifluoride.

21. A process as claimed in claim 18 in which the water compatible sulfonated hydrocarbon contains from about 10 carbon atoms to about 30 carbon atoms.

22. A process as claimed in claim 18 in which the glass is rendered nonresponsive prior to contact with the water compatible sulfonated hydrocarbon.

23. A process as claimed in claim 18 in which the water compatible sulfonated hydrocarbon is used in a concentration of from about 0.15 to about 4 lbs per ton of the particulate inorganic mass.

24. A process as claimed in claim 18 in which the water compatible sulfonated hydrocarbon is used in a concentration of from about 0.5 to about 4 lbs per ton of the particulate inorganic mass.

25. A process as claimed in claim 18 in which an extender for the water compatible sulfonated hydrocarbon is present.

26. A process as claimed in claim 18 in which the particulate inorganic mass including said glasses is of a particle size between about 200 mesh and 20 mesh.

27. A process for recovery of glass from a particulate mixture of substantially inorganic materials including glass which comprises subjecting a particulate mixture of substantially inorganic materials including glass obtained from municipal solid waste, the inorganic materials other than glass constituting gangue and having a particle size less than about 10 mesh:
(i) to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms; and
(ii) to the action of a beneficiating amount of said water compatible sulfonated hydrocarbon, the gangue being responsive to the beneficiating action of said water compatible sulfonated hydrocarbon;
and forming a float predominantly containing the gangue and a tailing predominantly containing glass.

28. A process for recovery of glass from a particulate mixture of substantially inorganic materials including glass, which comprises subjecting a particulate mixture of substantially inorganic materials including glass obtained from municipal solid waste, the inorganic materials other than glass constituting gangue and having a particle size between about 325 mesh and about 20 mesh;
(i) to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms; and
(ii) to the action of a beneficiating amount of said water compatible sulfonated hydrocarbon, the gangue being responsive to the beneficiating action of said water compatible sulfonated hydrocarbon;
and forming a float predominantly containing the gangue and a tailing predominantly containing glass.

29. In a process for the treatment of solid wastes for recovery of values contained therein which includes classifying the solid waste into a generally organic fraction, a metals fraction and an inorganic tailing including glass, said inorganic tailing being substantially free of metals, the portion of the tailing other than glass being gangue, the improvement which comprises:
(a) forming from the inorganic tailing a particulate inorganic mass including glass having a particle size between about 325 mesh and about 20 mesh;
(b) subjecting the particulate inorganic mass to the action of an aqueous medium having a pH of from about 2 to about 4 and containing at least one glass suppressant material selected from the group consisting of mineral acids, and fluoride ion for a time sufficient to render the glass nonresponsive to the beneficiating action of at least one water compatible sulfonated hydrocarbon containing at least 5 carbon atoms and to the action of a beneficiating amount of said water compatible sulfonated hydrocarbon, the gangue being responsive to the beneficiating action of said water compatible sulfonated hydrocarbon; and
(c) forming a float predominantly containing the gangue and a tailing predominantly containing glass.

* * * * *

UNITED STATES PATENT AND TRADEMARK OFFICE
CERTIFICATE OF CORRECTION

PATENT NO. : 4,269,700

DATED : May 26, 1981

INVENTOR(S) : William R. White

It is certified that error appears in the above—identified patent and that said Letters Patent is hereby corrected as shown below:

Column 1, line 65, after "1976" insert -- now U. S. Patent No. 4,077,847 --. Column 2, line 51, after "acid" (second occurrence) insert -- and --; line 56, "adhead" should read -- ahead --. Column 5, line 1, "1.15" should read -- 0.15 --; line 29, "fluoride" should read -- bifluoride --. Column 7, line 19, after "1975" insert -- now U. S. Patent No. 4,070,273 --.

Signed and Sealed this

Fifteenth Day of September 1981

[SEAL]

Attest:

Attesting Officer

GERALD J. MOSSINGHOFF

Commissioner of Patents and Trademarks